(No Model.)
C. W. TREMAIN.
AUTOMATIC CUT-OFF VALVE.
No. 421,453. Patented Feb. 18, 1890.
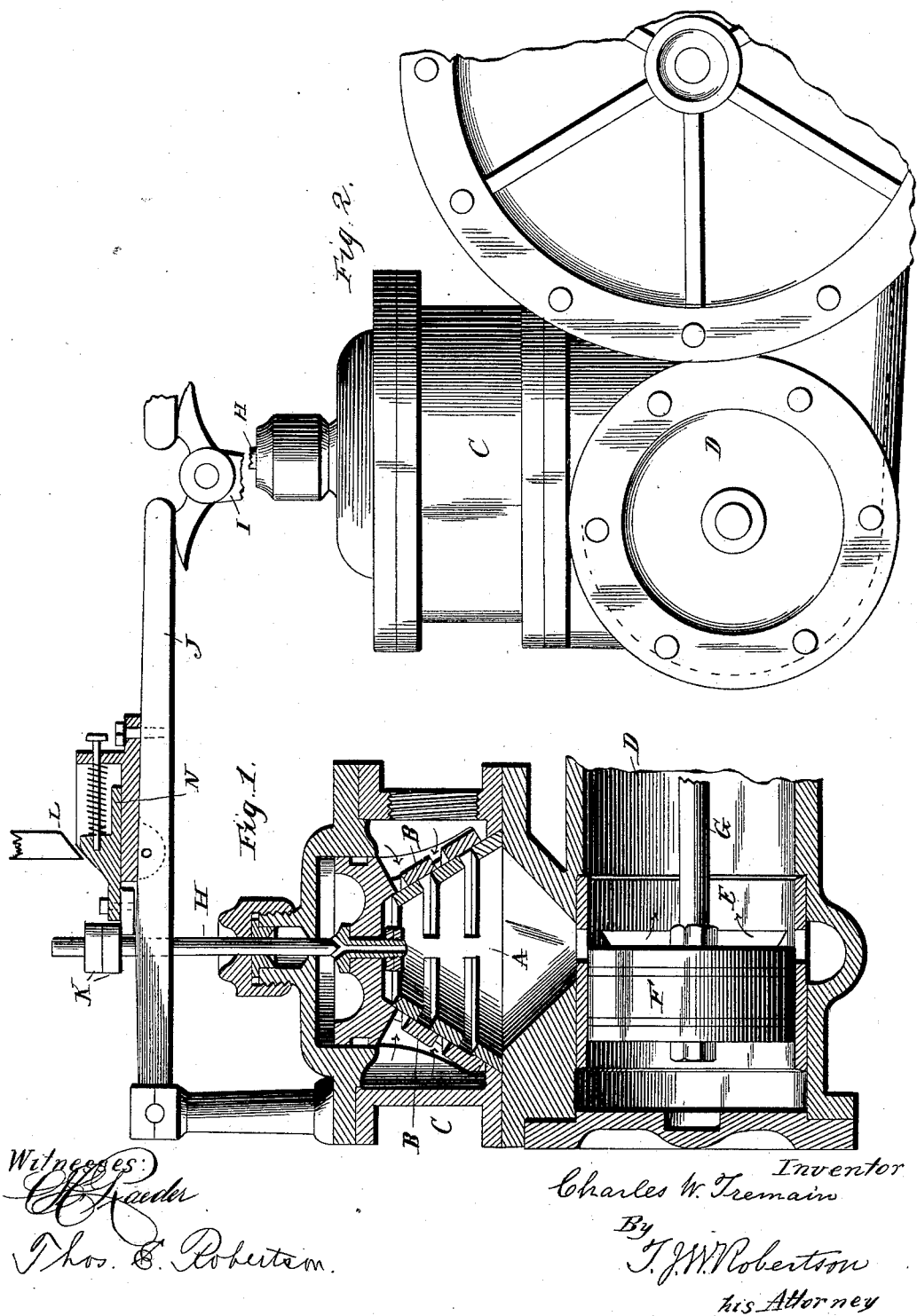
Witnesses:
Inventor
Charles W. Tremain
By
T. J. W. Robertson
his Attorney

UNITED STATES PATENT OFFICE.

CHARLES W. TREMAIN, OF PORTLAND, OREGON, ASSIGNOR TO THE PROSPECTIVE MINING AND MACHINERY COMPANY, OF OREGON.

AUTOMATIC CUT-OFF VALVE.

SPECIFICATION forming part of Letters Patent No. 421,453, dated February 18, 1890.

Application filed July 30, 1889. Serial No. 319,225. (No model.)

*To all whom it may concern:*

Be it known that I, CHARLES W. TREMAIN, a citizen of the United States, residing at Portland, in the county of Multnomah and State of Oregon, have invented certain new and useful Improvements in Automatic Cut-Offs and Stop-Valves, of which the following is a specification, reference being had therein to the accompanying drawings.

Figure 1 is a side elevation of one end as applied to a steam-cylinder. Fig. 2 is an end view.

This invention has for its object the quick and full admission of steam to the cylinder and the absolute control of the point of cut-off.

It consists in the peculiar arrangement of a conic-shaped valve, which is operated on the puppet system for the admission of the steam, and the combination of the well-known piston-valve for operating the exhaust-steam. (Patents No. 50,053 and No. 92,251 were granted me for the piston-valve.)

In the drawings, C represents a steam-chest with cover. A is the conical-shaped seat for the valve B, and is provided with two or more openings in the circumference for the admission of the steam to the cylinder. The inside of the seat is provided with bars or ribs to strengthen and permit of the seat and the openings therein being turned. The seat is also open at the top for the further admission of steam. The angle of the seat should not exceed sixty degrees. The valve B is also provided with openings corresponding with those in the seat, also ribs to strengthen, and is bored to fit the seat. When the valve is closed, the openings will be about midway of those in the seat. (See B, Fig. 1.) The valve is further provided with a head or piston working in the cover of the steam-chest. This piston diameter should be less than the base of the valve, sufficient to insure the seating of the same. When the valve is lifted slightly from the seat, the steam is admitted above the piston through the stem at H, or any opening in the head by which a balance is maintained, but allowing the valve to seat easy when released by the trip-gear. The exhaust or piston valve is located in the round chest, as close as possible to the conical valve.

The piston-valve F, seat E, and stem G are constructed and operated in the usual way, (direct,) with this exception, only one side of the piston is required in combination with the conical puppet-valve. This valve receives a reciprocal motion from the eccentric. The same motion being easily transmitted to the arm I will lift the lever J, and through the stem H the valve B, and coming in contact with the bevel-piece L the trip N is released from under the collars on stem H, and the valve B is allowed to return to its seat, cutting off the steam at any point in the cylinder where this contact occurs. The bevel-piece L may be held in position by an adjustable lever, as in the case of a steamboat-engine, or by the simple well-known fly-ball governor for stationary engines. All of the adjustments of these valves can be made when running.

What I claim as my invention, and desire to secure by Letters Patent, is—

The combination of the cylinder, the piston-seat therein, the steam-chest communicating with said seat, the valve-seat having ports, the valve fitting on said seat and having ports adapted to communicate with the ports of the seat, the valve-stem having a stop, the lever for elevating the stem, and the detent on the lever for engaging the stop on the valve-stem, substantially as described.

In testimony whereof I affix my signature, in presence of two witnesses, this 17th day of July, 1889.

CHARLES W. TREMAIN.

Witnesses:
A. OHLHOFF,
WM. E. POPE.